United States Patent [19]

Cicuta et al.

[11] Patent Number: 5,028,359
[45] Date of Patent: Jul. 2, 1991

[54] PROCESS OF CONSOLIDATING LOW-MELTING MATERIALS

[75] Inventors: Aldo Cicuta, Novara; Vincenzo Massa, Busto Arsizio, both of Italy

[73] Assignee: Ausimont S.r.l., Italy

[21] Appl. No.: 256,641

[22] Filed: Oct. 12, 1988

[30] Foreign Application Priority Data

Oct. 13, 1987 [IT] Italy ............................. 22234 A/87

[51] Int. Cl.$^5$ ............................................. C23C 16/00
[52] U.S. Cl. ............................................. 264/4; 264/81; 427/212; 427/222; 427/255.6
[58] Field of Search ............................. 264/81, 4, 255; 427/212, 222, 255.6

[56] References Cited

U.S. PATENT DOCUMENTS

| | | | |
|---|---|---|---|
| 3,379,803 | 4/1968 | Tittmann et al. | 264/81 |
| 3,509,075 | 4/1970 | Niegisch et al. | 528/396 |
| 4,186,164 | 1/1980 | Spivack | 264/81 |
| 4,291,244 | 9/1981 | Beach et al. | 264/81 X |
| 4,291,245 | 9/1981 | Nowlin et al. | 264/147 X |
| 4,508,760 | 4/1985 | Olson et al. | 427/213.34 |
| 4,521,353 | 6/1985 | Bonnot et al. | 264/81 X |

FOREIGN PATENT DOCUMENTS 0036923 10/1981 European Pat. Off. .
1006733 10/1965 United Kingdom .

OTHER PUBLICATIONS

*Kirk-Othmer Encyclopedia of Chemical Technology*, Third Edition, vol. 24, Sections "Xylylene Polymers", New York, John Wiley & Sons, A. Wiley-Interscience Publication, c 1984, pp. 746, 747.

*Primary Examiner*—Mary Lynn Fertig
*Attorney, Agent, or Firm*—Morgan & Finnegan

[57] ABSTRACT

A process for the consolidation of discrete, particulate, low-melting or liquid materials, characterized in that said materials are consolidated in their particulate discrete form by application of vapors of at least one p-xylylene monomer and/or of a derivative thereof, which is polymerized under vacuum. The materials are thus given the surface characteristics of a solid, with enhanced properties of mechanical, physical and/or chemical strength, even in the presence of high temperatures. The invention is particularly useful for the metered addition of predetermined amounts of compositions or for moving mechanical parts.

6 Claims, 1 Drawing Sheet

PROCESS OF CONSOLIDATING LOW-MELTING MATERIALS

DESCRIPTION OF THE INVENTION

The present invention relates to a process for the consolidation of low-melting materials.

More particularly, the present invention relates to a process for the consolidation of materials, in particular low-melting materials or materials in the liquid state under normal application conditions, or which tend to liquefy under normal conditions (deliquescent materials), thereby endowing them with the physical surface characteristics of a solid, with improved mechanical, physical and/or chemical resistance, even in the presence of a higher-than-normal temperature.

Still more precisely, the object of the present invention is to provide a process of consolidating the above low-melting materials, or materials tending to liquefy under their conditions of use, and/or which are in the liquid state, by coating the said materials, while in a discrete particulate form, with a film of p-xylylene polymer, which is more fully defined below.

In this way, protected products or protected articles of manufacture are obtained, which show, because of the p-xylylene polymer coating, the exterior characteristics of integrity of a solid material, which characteristics are retained even when the coated material is exposed to temperatures higher than its melting temperature.

This invention finds application e.g. in the case of lubricating and/or antioxidant substances in many industrial sectors. In fact, the process of the present invention allows such product or substance (e.g. a lubricant and/or antioxidant agent) to be used in a localized way, or simply stored in a discrete particulate form, even after it has already then placed in its position of end use until the time of its use then arrives, at which time the coating will be broken by mechanical and/or chemical means, already existing in situ under the conditions of operation, in such a way as to release the material in the desired amount and at the desired place and at a predetermined time.

Instances of this type are, for purposes of exemplification, those of the metered and aimed or directed lubrication of mechanical parts under conditions of discontinuous movement, the case of the addition and of metering in general, and so forth, wherein use is made of substances whose physical state changes when they encounter operative conditions. A typical application is the lubrication of moving mechanical parts, which may reach temperatures of the order of 200° C. and even higher, and for which lubricating substances are used which, under normal conditions, have a wax-like consistency, with a melting point range e.g. between the approximate limits of 50° C. and 60° C. Another typical example is that of analogous materials in a discrete particulate form, or in the form of pieces of small size, say of the order of a few centimeters or of a fraction of a centimeter (0.1-10 cm), which are difficult to handle, store, and so forth, and whose discrete particulate individuality, on the contrary, is to be maintained until their time of use.

This latter is the case of encapsulation for processing and handling of low melting and/or sticky particles, objects, articles of manufacture, in order to prevent them from becoming packed. Consider, e.g., the case of small spherical or cube-shaped or cylindrical pellets of wax or paraffin, or of any other low-melting and/or tacky materials. These will tend to stick to each other, or anyway to lose their initial shape, particularly at a temperature close to the melting point of the paraffin or of the wax. The present invention prevents these drawbacks from occurring, and enables the individual particles to retain their individuality or shape, even at temperatures higher than the melting temperature of the material undergoing treatment.

On the other hand, in many cases, apart from the economic burden, the normal refrigerating techniques—by means of which the low-melting material is maintained below its softening temperature until its time of use—cannot be easily performed.

Also the technique of encapsulation of these materials with film-forming products, per se known, is not free from drawbacks owing to the problem of the removal of the coating, which is generally of too great a thickness as regards the predetermined use, as well as to the insufficient dynamic and physical stability, which, on the contrary, is required for such products or materials. Furthermore, technological problems often arise during the application of the coating to the particles to be protected.

It is known to use polymers of p-xylylene and of its derivatives, for providing coatings on various supports in the solid, including particulate, state for the purposes of their chemical and/or physical protection. Nevertheless, the problems are not solved of a metered and—in situ—delayed use until the time of use of the material, and in particular of low-melting materials, or materials tending to liquefy under conditions of use, or liquid materials, giving them the characteristics of consolidated discrete particles.

Therefore, the object of the present invention is to provide a simple and economically competitive process for the consolidation of low-melting, liquid or deliquescent materials, as hereinabove defined, which, by the way, are given improved mechanical, physical, and chemical resistance until the time of their operative use, and, in particular, also at a temperature higher than the melting temperature of the consolidated material.

This and still other objects which will be clearer to those skilled in the art from the following disclosure are achieved according to the present invention, by means of a process of consolidating low-melting or liquid discrete particulate materials, characterized in that said materials are consolidated in their discrete particulate form by means of the application of vapors of at least one p-xylylene monomer, and/or of a derivative thereof, which is polymerized under vacuum.

In such a way, the characteristics of chemical-physical stability are given to, or preserved in, the liquid materials, or the solid materials which tend to liquefy under handling and/or application conditions.

The p-xylylene used corresponds to formula (I):

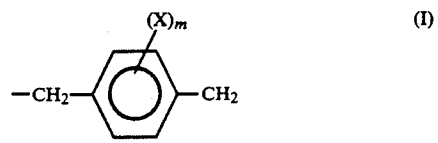

wherein:
X represents a $(C_1-C_6)$-alkyl group, a $(C_6-C_{10})$-aryl group, a $(C_7-C_{16})$-aralkyl group, a haloalkyl or haloaralkyl group, an acetoxy group, an alkenyl group, an aminoalkyl group, an arylamino group, a cyano group, an alkoxy group, a hydroxy group, a nitro group, a halogen atom, a sulphonic radical or a sulphonic ester, phosphorus-containing substituents, sulphonic groups, sulphide groups, alkyl-sulphoxide groups, or a hydrogen atom, and m is equal to 0 or is an integer of from 1 to 4.

Because of the strong reactivity, which causes serious problems of storage and handling, in the practical applications the starting material is a p-xylylene dimer or (2,2)-para-cyclophane corresponding to the formula (II):

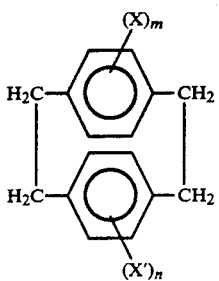

where X and X', equal to or different from each other, and m and n, equal to or different from each other, are defined as stated above for respectively X and m; such starting material being crystalline solid, stable at room temperature, and easy to store and handle.

The p-xylylene monomer having formula (I) is applied to the material to be consolidated, as above defined, according to the so-called "vapor vacuum deposition" technique.

According to such technique, the divalent radicals of p-xylylene, or of its derivative, having formula (I), are produced under vacuum by means of a thermal cracking, at a temperature higher than 400° C., of the corresponding (2,2)-paracyclophane of formula (II), thus generating vapors of reactive radicals of formula:

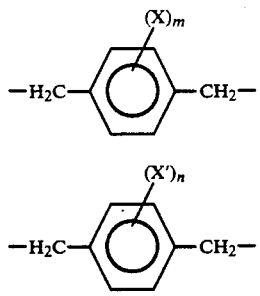

where X and X' and m and n have the same meanings as indicated above.

When m and n are equal to each other and the substituents on each ring are the same, two mols of the same p-xylylene radical are formed, which, by condensation, generate an either substituted or un-substituted p-xylylene homopolymer. When, on the contrary, m and n are different from each other, or when the X and X' substituents on each radical are different from each other, their condensation leads to the formation of p-xylylene copolymers.

The divalent p-xylylene radicals condense and polymerize nearly instantaneously in the structure, forming a compact polymer.

The process according to the present invention is carried out under pressure within the range of from 0.01 to approximately 1 mm Hg.

For the production of the reactive vapors of divalent radicals of the p-xylylene having formula (I) on the surface of the particulate materials to be treated, any per se known apparatus may be used, such as e.g. the apparatus described in the Kirk-Othmer Encyclopedia of Chemical Technology, 3rd Edition, Vol. 24, pages 746–747.

Generally, said apparatus comprises a chamber capable of containing the substrate to be consolidated, maintained at a temperature lower than 200° C., or generally lower than the condensation temperature of the particular type of p-xylylene being used. The chamber is in communication with an evaporation-cracking furnace by means of a labyrinth-like passage. The furnace is maintained at a high enough temperature for evaporating and cracking (2,2)-paracyclophane, or its derivatives. Said (2,2)-paracyclophane, or its derivative, is maintained inside the furnace for a long enough time to be evaporated and cracked, in order to form the corresponding divalent p-xylylene radicals.

These radicals enter the deposition chamber and, by coming into contact with the surface of the material to be treated, polymerize as a continuous envelope, thus consolidating said material.

The process of the present invention hence finds application in the consolidation or encapsulation of any material, manufactured articles, objects, substrates characterized by a low melting temperature, and precisely lower than the melting temperature of the p-xylylene polymer to be employed, thus rendering the material solvent-proof or resistant to other chemicals (acids, alkalies, salts, solvents, oils and fats, water and so forth).

The treatment causes the article to maintain its shape, as well as a sufficiently high consistency even at a temperature higher than the melting temperature of the material of which it is constituted. The process is suitable for the treatment of any solid or liquid material, provided it can be treated under vacuum at a residual pressure of the order of 0.01 mm Hg.

The thus-obtained articles readily withstand further treatments, maintaining their integrity even at a temperature higher than the melting temperature of the material contained therein.

Efficacious p-xylylene monomers of formulate (I) are, for exemplifying purposes, chloro-p-xylylene (derived from dichloro-(2,2)-paracyclophane), cyano-p-xylylene, iodo-p-xylylene, fluoro-p-xylylene, hydroxymethyl-p-xylylene, ethyl-p-xylylene, methyl-p-xylylene, aminomethyl-p-xylylene, carbomethoxy-p-xylylene, and their mixtures.

As indicated above, the coating of the articles is carried out by using the usual deposition apparatus for depositing a paracyclophane film under vacuum by means of the technique known in the art as the "vapor vacuum deposition."

Various procedures may be employed, such as e.g. the use of equipment supplied with a rotary deposition chamber into which the material is charged in bulk inside the chamber. During the deposition, the chamber revolves on itself around a horizontal axis, and during its movement continuously moves the material charged to said chamber. The material, by being kept continuously moving, is coated by a continuous film over the whole surface thereof.

As an alternative, a chamber equipped with support plates revolving on themselves around a vertical axis may be used. The material to be treated is positioned on the supports. During the deposition the plates revolve, allowing the film to be deposited on the entire surface of the material but for the points of contact with the support plates. For a complete deposition of the film on the whole surface of the materials, the points of contact with the support must be changed and so a second coating must necessarily be carried out.

According to a preferred form of the invention, purposely designed molds of suitable shape are used as the supports for the materials. The molds are provided e.g. with suitable hollows having the desired shape and size, and are treated in such a way as to endow them with an adhesion to the paracyclophane film as low as possible e.g. by first depositing on them an extremely thin oil layer. The same molds are then coated with a paracyclophane film inside the usual deposition apparatus. To the thus-coated molds the materials to be coated are charged inside the purposely provided cavities, or the substance is directly poured into the mold in the molten sate and is allowed to solidify. The thus-filled mold is then placed again inside the deposition chamber, for the final coating. When the operation is ended, the film with the embedded particles of consolidated material is taken removed from the mold. The individual particles may be easily obtained by cutting the film which binds them to each other by means of a conventional die cutting in a simple cutting technique.

This latter form of embodiment of the process according to the present invention is schematically shown in the accompanying drawing, wherein.

Figure 1:
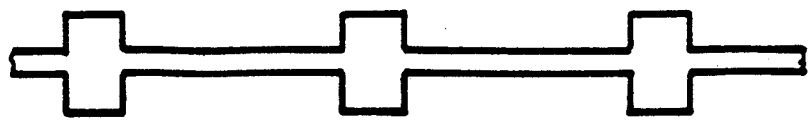
FIG. 1 represents an example of a mold.
Figure 2:
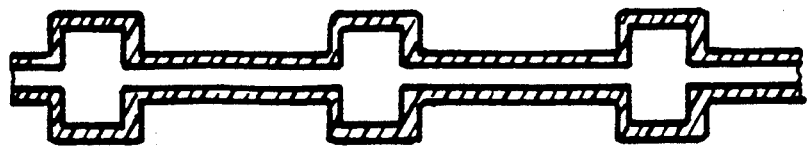
FIG. 2 represents the first poly-p-xylylene coating (enormously magnified) on the mold of FIG. 1.
Figure 3:
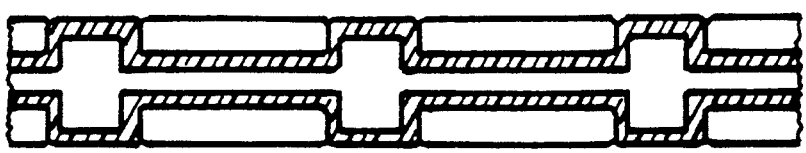
FIG. 3 represents the material to be coated charged to the cavities of the mold.
Figure 4:
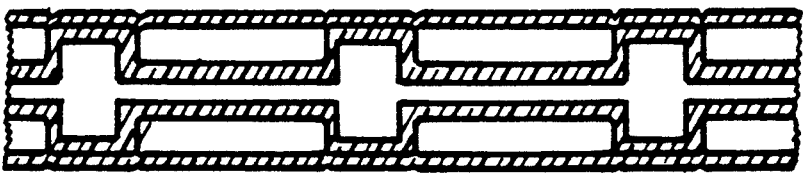
FIG. 4 represents the second poly-p-xylylene coating (enormously magnified)
Figure 5:
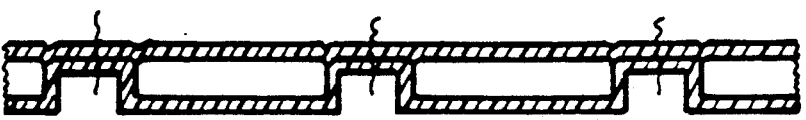
FIGS. 5, 6 represent the coated material.
Figure 6:
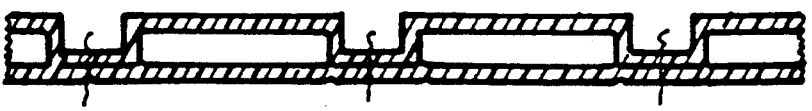

The present invention is still further explained by the following examples, which are supplied merely for illustrative purposes, and are not to be construed as being limitative of the invention.

EXAMPLE 1

Fifty cylindrical pellets of paraffin, with a melting range from 51° C.–53° C., 10 mm in diameter×10 mm in height, were charged in to the vapor deposition chamber of an apparatus for the dichloro-(2,2)-cyclophane polymerization, provided with rotary horizontal plates. 100 g of dichloro-(2,2)-paracyclophane was evaporated at 200° C. and 50 micrometers Hg. The vapors were heated in a quartz tube maintained at 680° C. in order to pyrolyse dichloro-(2,2)-paracyclophane and form the corresponding divalent chloro-p-xylylene radicals. The resulting radicals in vapor form were transferred into the deposition chamber maintained at a temperature lower than 40° C., inside which they condensed on the surface of the substrate, to form the poly-chloro-p-xylylene polymer.

The samples were removed from the deposition chamber, turned upside-down and placed again on the plates inside the deposition chamber. A further 100 g of chloro-(2,2-paracyclophane was evaporated under the same conditions as previously stated.

Five samples dipped in boiling water for 1 hour maintained their integrity and shape.

Five samples dipped in toluene for 1 hour maintained their integrity and shape. Toluene was heated to its boiling temperature, and made to boil for 5 minutes; the samples dipped in the boiling toluene also maintained their integrity and initial shape.

EXAMPLE 2

Example 1 was repeated except for the following changes: the first time 50 g of dichloro-p-cyclophane was charged, and the second time a further 50 g was charged. In this case too, the samples were dipped in boiling water for 1 hour, without showing any symptoms of degradation. The toluene tests gave a positive (favorable) result, too.

EXAMPLE 3

Example 1 was repeated with the exception that the paraffin samples were cylindrical pellets 10 mm in diameter×2 mm in height. Both tests in water and in toluene gave positive results.

EXAMPLE 4

Example 2 was repeated with the samples being the same as those of Example 3. The tests in water and in toluene gave positive results.

What is claimed is:

1. Process of consolidating low-melting or liquid discrete particulate materials in their discrete particulate form, comprising applying a coating of at least one p-xylylene monomer and/or derivatives thereof polymerized under vacuum, said process including the steps of vapor vacuum depositing the p-xylylene monomer onto molds, applying an individual particle of the low melting or liquid material to each of the molds, applying a second layer of the p-xylene monomer by vapor vacuum deposition and removing consolidated particle from the molds.

2. Process according to claim 1, wherein the p-xylylene monomer corresponds to formula (I):

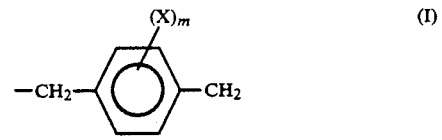

wherein:

X represents a $(C_1-C_6)$-alkyl group, a $(C_6-C_{10})$-aryl group, a $(C_7-C_{16})$-aralkyl group, a haloalkyl or halo-aralkyl group, an acetoxy group, an alkenyl group, an aminoalkyl group, an arylamino group, a cyano group, an alkoxy group, a hydroxy group, a nitro group, a halogen atom, a sulphonic radical and a sulphonic ester, phosphorus-containing substitutents, sulphonic groups, sulphide groups, alkylsulphoxide groups, or a hydrogen atom, and m is equal to 0 or is an integer of from 1 to 4.

3. Process according to claim 1 or 2, wherein the p-xylylene monomer of formula (I) is obtained by thermal cracking, at a temperature higher than 400° C., of the corresponding (2,2)-para-p-cyclophane having formula (II):

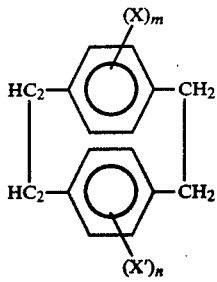

(II)

wherein:

X and X', equal to or different from each other, represent ($C_1$-$C_6$)-alkyl groups, ($C_6$-$C_{10}$)-aryl groups, ($C_7$-$C_{16}$)-aralkyl groups, haloalkyl or haloaralkyl groups, acetoxy groups, alkenyl groups, aminoalkyl groups, aryalamino groups, cyano groups, alkoxy groups, hydroxy groups, nitro groups, halogen atoms, sulphonic radicals or sulphonic esters, phosphorus-containing substituents, sulphonic groups, sulphide groups, alkyl-sulphoxide groups, or hydrogen atoms, and m and n, equal to or different from each other, are equal to 0, or represent integers from 1 to 4.

4. Process according to claim 1 or 2, wherein the p-xylylene monomer is selected from the class consisting of chloro-p-xylylene, cyano-p-xylylene, iodo-p-xylylene, fluoro-p-xylylene, hydroxymethyl-p-xylylene, ethyl-p-xylylene, methyl-p-xylylene, aminomethyl-p-xylylene, carbomethoxy-p-xylylene, and their mixtures.

5. Process according to claim 1 or 2, wherein the process is carried out by the "vapor vacuum deposition" technique inside a deposition chamber revolving around a horizontal axis.

6. Process according to claim 1 or 2, wherein the process is carried by the "vapor vacuum deposition" technique inside a deposition chamber equipped with support plates revolving around a vertical axis.

* * * * *